Patented Nov. 18, 1947

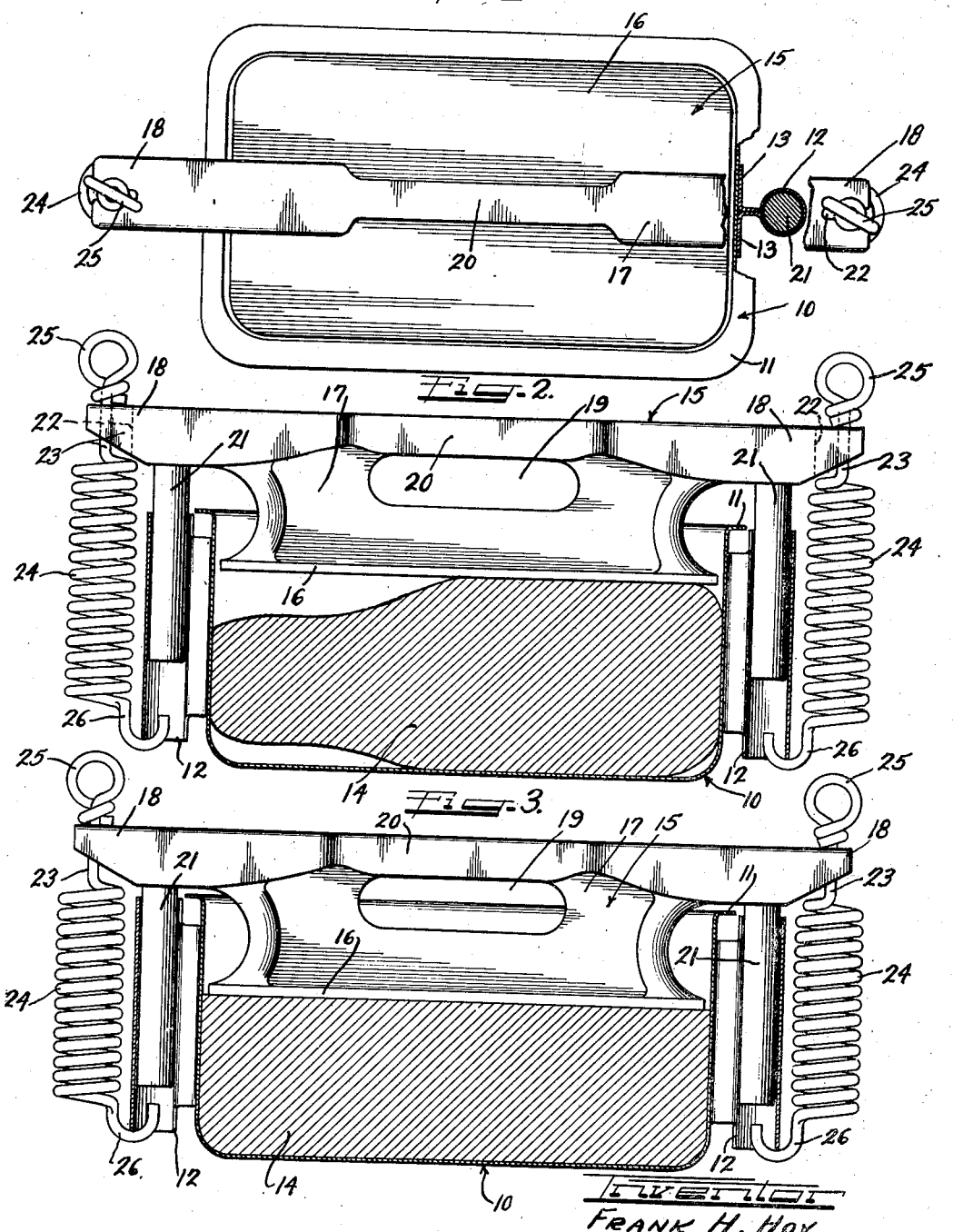

2,431,253

UNITED STATES PATENT OFFICE 2,431,253

MEAT MOLD

Frank H. Hoy, Milwaukee, Wis., assignor to Hoy Equipment Company, Milwaukee, Wis., a corporation of Wisconsin Application September 2, 1944, Serial No. 552,444

1 Claim. (Cl. 99—351)

This invention relates to a mold and more particularly to a molding pan structure of the type used in the fabrication of pressed hams, meats, and the like.

An object of this invention is to provide a simple compact meat mold which is not only economical to manufacture, but is relatively light in weight and easy to clean.

Another object of this invention is to provide a meat mold of the type including a cover and a bottom pan so interrelated that the cover can be moved into the pan under spring tension but without any likelihood of cocking relative to the pan.

Yet another object of the invention relates to the provision of a simple mold which will uniformly compress ham or the like so that the ensuing product has a substantial uniform cross section.

Still another object of the invention relates to the provision of a mold including a bottom pan and a cover so interrelated that the cover in telescoping the pan will constantly be under the force of spring pressure after the mold has been removed from a suitable press employed in the meat compressing operation.

In accordance with the general features of this invention, there is provided for use in an open top molding pan, a cover having a lid portion of a size to fit in the open top of a pan and to closely follow the walls thereof and lateral portions above the plane of the lid portion and provided with opposite guide elements for telescoping cooperation with opposite portions of the pan; the lateral portions being so formed so as to receive the ends of springs arranged for connection to the sides of the pan.

Another feature of the invention relates to the provision of a mold structure including the above referred to cover and a bottom pan having tubular guide portions which extend through a major portion of the height of the pan and each of which is arranged to have a lower end of a tension spring inserted therein, the upper end of each tubular portion being arranged to receive a guide stud on the lid.

Other objects of this invention will more fully appear from the following detailed description, taken in connection with the accompanying drawing, which illustrates a single embodiment thereof, and in which:

Figure 1 is a plane view of my novel mold structure partly broken away and in section at one end to show the manner in which the tubular guide on the pan receives the guide stud on the cover.

Figure 2 is a side view of the structure shown in Figure 1, showing a pan in cross-section with the ham in position to be compressed, the cover and springs being shown in elevation, and Figure 3 is a view similar to Figure 2 after the ham has been compressed in the mold and showing how the cover is under the tension of the opposite springs thus holding the packed meat in a tightly compressed state during further processing or cooking.

As shown on the drawings:

It should be noted at the outset that while for the purpose of illustration in Figures 1 and 2 I have shown the springs applied to the mold prior to the pressing of the ham in a suitable press (not shown), I preferably apply them to the mold after the meat pressing operation as shown in Figure 3, as there is no substantial advantage to be gained in applying them prior to the pressing operation. The reason for this is that the press exerts so much more pressure than the springs as to make springs of no advantage until the meat has been compacted.

The reference character 10 designates generally an open top molding pan, which may comprise a stamping of any suitable material, such for example, as stainless steel sheeting or the like. The upper edge of the pan may be flanged at 11, if such flanging is so desired.

The opposite sides or ends of the pan are provided with integral tubular guides 12—12, which may be identical in construction. Each of these guides may be made of a stamping in which the metal is bent into two overlapping halves, forming the tubular guide portion proper and divergent legs 13—13 (Figure 1) welded or otherwise secured to the end of the pan.

It will be perceived that each of the tubular guides 12 extends substantially through a major portion of the height of the pan so that there is provided a guiding area substantially coextensive with the extent of movement of the cover 15 to be hereinafter described.

The cover 15 includes a lid portion 16 which is of a size to telescope the open top of the pan 10 and is of such dimension that its edges closely hug the side walls of the pan. It is below this lid that a mass of meat, such as a piece of boneless ham 14, is adapted to be disposed in the pan.

Formed integral with the lid portion 16 is an upstanding longitudinal rib 17 terminating at its extremities in lateral extensions 18—18, disposed in a plane substantially above the top edge 11 of the pan. These extensions 18 are identical in construction and are arranged so as to be directly over the tubular guides 12—12.

The rib 17 may also be provided with a hand hold 19 for facilitating handling of the cover. In other words, the cover is through the means of the opening 19 provided at 20 with a handle. Moreover, the lid portion 16, the rib 17 and the extensions 18 may also be formed integral as part of a single casting. I find that excellent results may be obtained, from the standpoint of lightness and economy in manufacture, by casting the entire cover 15 from suitable metallic material, such as aluminum, or the like.

In addition, the cover 15 may have cast as integral parts thereof downwardly extending opposite guide studs 21—21, which are identical in construction, and are adapted to telescope the tubular guides 12—12 on the ends or sides of the pan. Each of these guide studs 21 may be of a cylindrical configuration. While I prefer fabricating them integrally with the cover, they may of course be separate pieces of metal, suitably fastened to the extensions 18—18.

Each of the lid extensions 18 is slotted at 22 to receive an upper end 23 of a tension coil spring 24. The extremity of the upper end 23 of the spring is coiled or turned at 25, and bridges or straddles the gap formed by the slot 22, as shown in Figure 1.

The lower end of each of the springs 24, which are identical in construction, is formed into a hook 26 inserted in the lower end of the adjoining tubular guide 12 on the pan.

The convolutions or coils of each of the springs 24 are so arranged that the spring when in use constantly exerts a force tending to move the lid portion 16 into the pan 10 during which time a mass of meat, under pressure, is within the pan.

In the use of this mold of my invention, the meat is first placed in the pan and then the lid portion 16 of the cover is inserted in the open end of the pan with the guide studs 21—21 telescoping the tubular guides 12—12.

After the mold has been thus assembled with a mass of meat 14 therein, the assembly is then placed, preferably without the springs, in a suitable press and subjected to a pressure, such for example, as twelve to fifteen hundred pounds. This results in the compression of the meat into a compacted mass at the bottom of the pan, as shown in Figure 3.

Thereafter the mold is removed from the press and the lower or hooked end 26 of each of the springs is inserted in the lower end of the guide tube 12, and the upper end 23 of the spring is pulled upwardly and slid laterally into the slot 22 in the extension 18 of the cover. In this manner the cover 15 is being pressed downwardly under tension against the compacted mass of meat 14 in the pan. It will further be perceived that due to the fact the studs 21—21 are each guidingly embraced at points above and below a medial plane of the pan, cocking of the cover relative to the pan is substantially precluded. This enables a uniform downwardly movement of the lid 16 under the force of the opposite coil springs 24—24.

I have found that with a particular size of molding pan, each spring, when stretched to an extent of about two inches, may apply a force of 175 pounds. However, after the processing of the ham, the spring may have contracted to such an extent that it only will be applying about 50 pounds of spring pressure.

The advantage of having these springs constantly apply pressure to the meat after it has been compressed, is that during cooking and other processing, the holes in the meat are kept closed and a substantial uniform product is enabled.

After the cooking of the ham, the cover is easily detached from the molding pan by pulling the spring ends 25 laterally away from their co-operation with the slotted extensions 18—18 of the cover. The cover may then be manually gripped at the handle 20 and removed from the pan. Thereafter the meat may be suitably removed from the pan. All parts are then free to be easily washed and cleaned for subsequent reuse.

I claim as my invention:

In a mold structure of the type including an open top molding pan having spaced guide portions and cover retaining springs, a cover having a lid portion of a size to fit in the top of the pan and closely follow the walls thereof and an upstanding integral central rib with lateral offset ends above the plane of said lid portion formed with parallel downwardly depending rigid guide studs for telescoping cooperation with opposite guide portions of the pan, said lateral ends, each having its extremity laterally outwardly of the associated stud provided with a spring receiving portion for detachably retaining an upper end of a cover retaining spring in close generally parallel relation to the adjoining stud.

FRANK H. HOY.

REFERENCES CITED

The following references are of record in the file of this patent:

UNITED STATES PATENTS

| Number | Name | Date |
| --- | --- | --- |
| 1,506,211 | Wilson et al. | Aug. 26, 1924 |
| 1,738,255 | Miller | Dec. 3, 1929 |
| 2,310,956 | Hoy | Feb. 16, 1943 |
| 2,310,957 | Hoy | Feb. 16, 1943 |

FOREIGN PATENTS

| Number | Country | Date |
| --- | --- | --- |
| 203,157 | Great Britain | Sept. 6, 1923 |
| 290,888 | Great Britain | May 24, 1928 |
| 465,708 | France | Apr. 23, 1914 |
| 636,768 | France | Jan. 16, 1928 |
| 714,315 | France | Sept. 1, 1931 |